Figure 1:
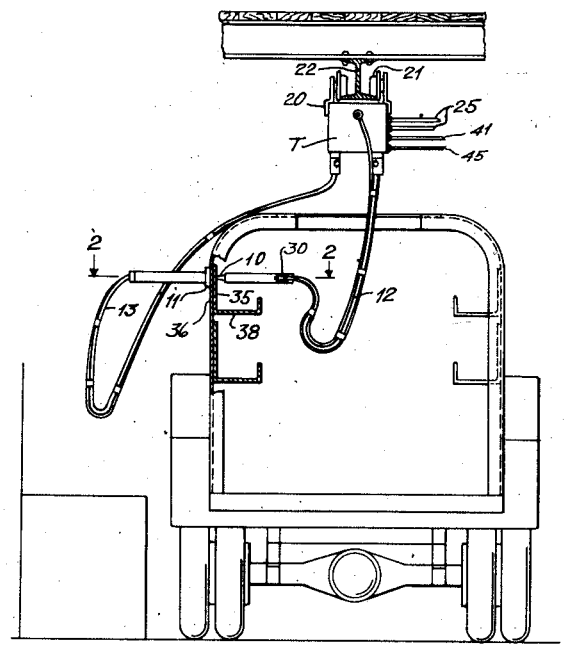

May 11, 1937.  J. H. HOLAN, JR  2,079,857
APPARATUS FOR WELDING
Filed Feb. 17, 1936  3 Sheets-Sheet 1

INVENTOR.
James H. Holan, Jr.
BY Bates, Goldrick & Teare
ATTORNEYS.

May 11, 1937.  J. H. HOLAN, JR  2,079,857
APPARATUS FOR WELDING
Filed Feb. 17, 1936  3 Sheets-Sheet 2

INVENTOR.
BY James H. Holan, Jr.
Bates, Solrick & Teare
ATTORNEYS

May 11, 1937.   J. H. HOLAN, JR   2,079,857
APPARATUS FOR WELDING
Filed Feb. 17, 1936   3 Sheets-Sheet 3

INVENTOR.
James H. Holan, Jr.
BY
Bates, Golrick & Faare
ATTORNEYS.

Patented May 11, 1937

2,079,857

UNITED STATES PATENT OFFICE 2,079,857

APPARATUS FOR WELDING

James H. Holan, Jr., Lakewood, Ohio

Application February 17, 1936, Serial No. 64,284

1 Claim. (Cl. 219—4)

This invention relates to welding apparatus and particularly to that type which is used for heavy duty welding in factories and in field work.

There is a wide field of application for heavy duty welding of sheet metal forms, but so far as I am aware the only apparatus, which has been used satisfactorily on heavy duty assembly work, has comprised a machine to which it has been necessary to bring the work. The type to which I have referred on which the work is mounted is held stationary while the other electrode is pressed against the work while the current is flowing therethrough. Accordingly, in the fabrication of many articles, such as sheet metal vehicle bodies or railroad cars, it has been necessary to secure the large coacting parts together, either by rivets, or by bolts.

Heretofore a portable welding apparatus has comprised a C-shaped frame which has carried a stationary electrode and also a movable electrode, the movable electrode being operated by a fluid actuated piston. The chief objection to such form of apparatus has been that it is extremely heavy in weight and bulky in size and that it is only adapted for welding where the frame can extend around the work. In assembling a motor vehicle, therefore, it has been necessary to drill holes in the coacting parts and then connect them by bolts or rivets. This is particularly true in making connections between the side and roof sheets.

Where rivets are used for connecting metallic plates or forms together, it has been necessary to preheat the rivets and then to upset them after they have been inserted in the rivet holes. This procedure is not only expensive, but is objectionable, for it is very difficult to upset a rivet unless an operator has sufficient room to swing the handle of a hammer in a circular path during the upsetting operation. Furthermore, there is always the difficulty of obtaining a tight connection whenever the rivet is not heated to the proper degree.

An object of my invention is to provide an apparatus by means of which articles may be fabricated substantially entirely by spot welding without necessitating the use of the heavy frame that carries the two electrodes. The invention includes an arrangement by means of which an operator may be able to effect the flow of current through parts that are difficult of access, and yet to obtain sufficient mechanical strength in the united parts to withstand the stresses to which they are subjected while in use.

An additional object is to provide an apparatus by means of which the electrodes possess universality of movement with reference to each other and also possess a range of movement that permits welding to be accomplished over a wide area for any setting of the apparatus.

A further additional object of my invention is to provide an apparatus which will enable two parts to be riveted together without requiring the rivet to be preheated, and without necessitating a large free area in the vicinity of the rivet for tool manipulation. In this connection, my invention includes a device, which will cause the flow of sufficient electrical current through the rivet to soften the end of it so that a head can be formed merely by hand pressure of the electrode against the rivet. Considerable difficulty has heretofore been experienced in welding metallic sheets to metallic tubes, particularly where the tubes obtain a considerable length and where they are curved such as in the frame work of the motor vehicle body or of a railroad passenger car. The shape and length of the tubes have prohibited the insertion of an electrode into the tubes, and so it has been necessary to fasten the plates to the tubes either by bolts or rivets, although welding would be greatly preferred.

An additional object of my invention, therefore, is to construct a welding apparatus, which is capable of welding plates to tubes without necessitating the insertion of an electrode within the tube.

Figure 4:
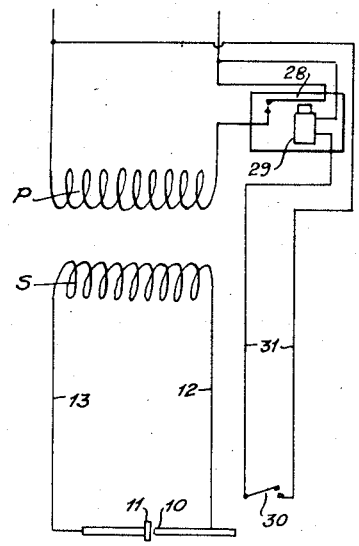
Figure 2:
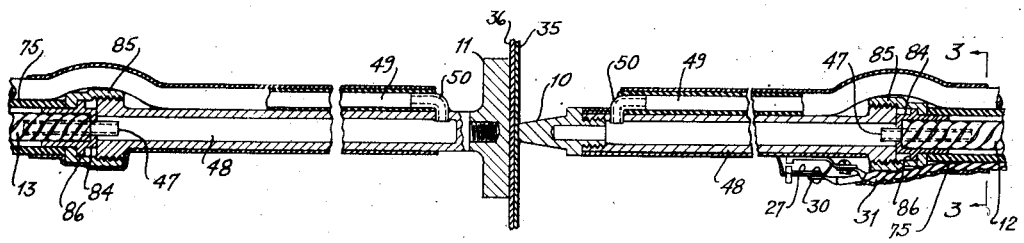
Figure 3:
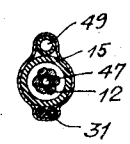
Figure 5:
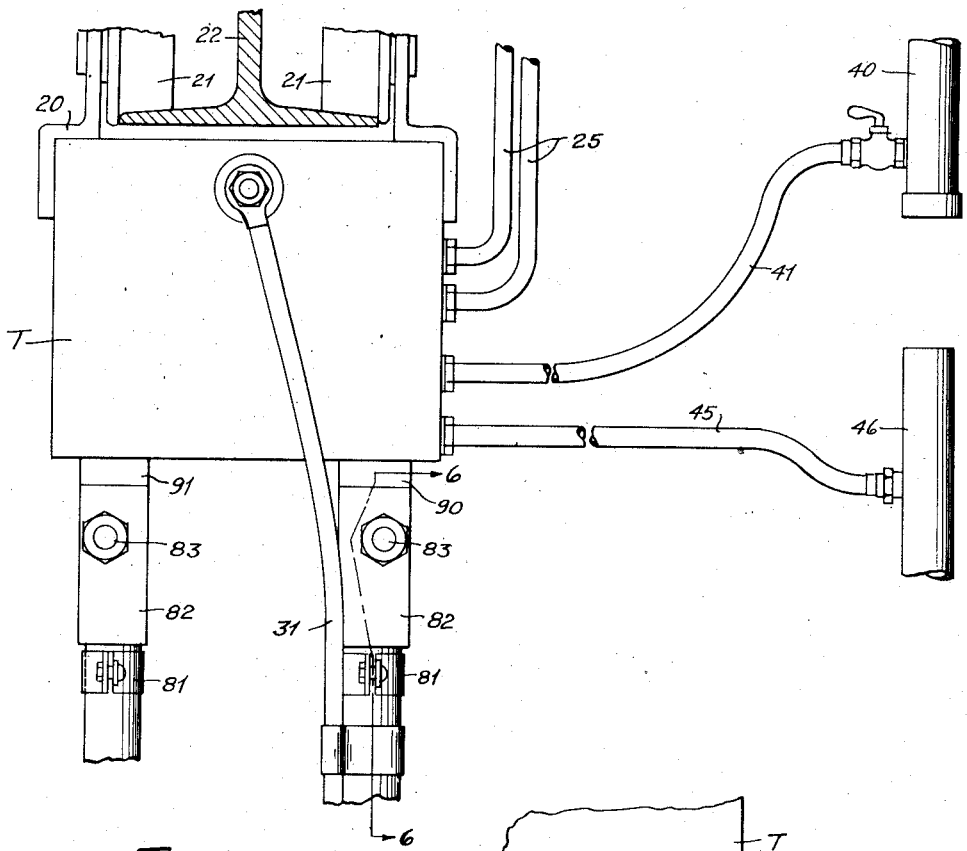
Figure 7:
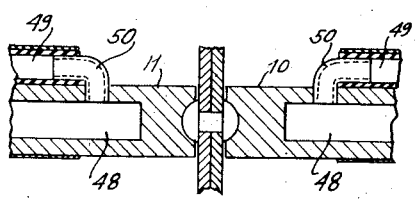
Figure 6:
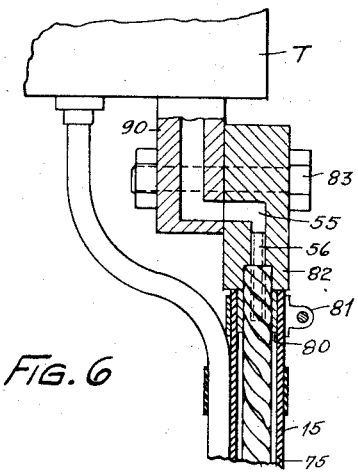
Figure 8:
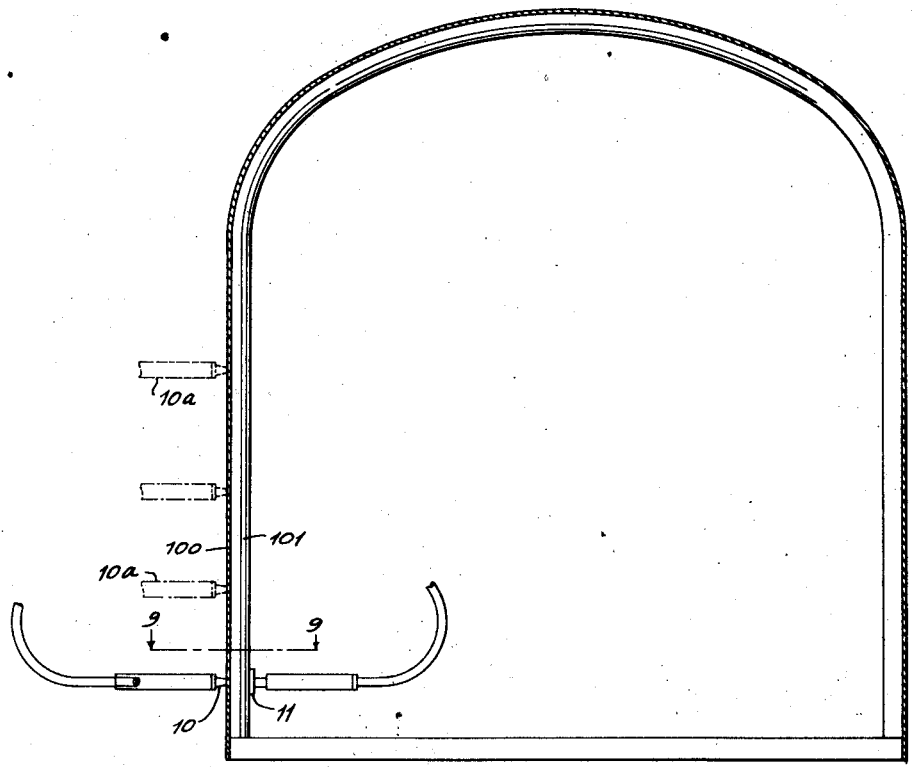
Figure 10:
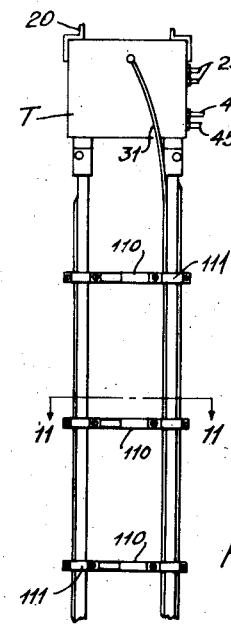
Figure 9:
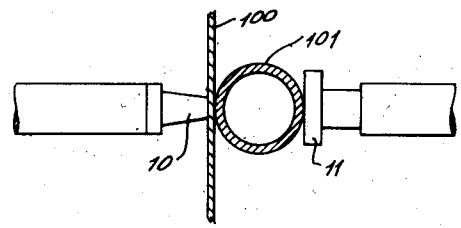
Figure 11:
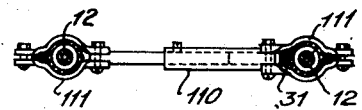

In the drawings, Fig. 1 represents an apparatus which is made in accordance with my invention, as being used for welding together the parts of a motor vehicle body; Fig. 2 is a section taken on the line 2—2 in Fig. 1 and on a scale larger than that shown in Fig. 1; Fig. 3 is a section taken on the line 3—3 in Fig. 2; Fig. 4 is a wiring diagram; Fig. 5 is an end view of the transformer that is mounted upon an overhead trackway; Fig. 6 is a section taken on the line 6—6 in Fig. 5; Fig. 7 is a sectional view through a modified form of electrode to show the use in connection with the up-setting of a rivet; Fig. 8 is a diagrammatic view, illustrating the use of my invention to welding a plate to a curved tube; Fig. 9 is a section on an enlarged scale through the plate and tube, taken on the line 9—9 in Fig. 8; Fig. 10 is a view illustrating means for holding the flexible conductors in predetermined spaced position; and Fig. 11 is an enlarged plan view of one of the spacers that are removed from the welding apparatus.

The apparatus, as illustrated in Fig. 1 comprises two electrodes 10 and 11, each of which is electrically connected to a conductor 12 and 13 respectively. Each conductor is sheathed by suitable electrical insulating material 15, and each comprises a secondary lead of a transformer that is indicated in general at T. The conductors are flexible so that each may be moved selectively and independently of the other; furthermore, each may be moved universally with reference to the transformer. The length of the conductors is dependent upon the task for which they are designed to be used, and the location of the transformer with reference to the work is also determined in accordance with the facilities at the place of use; the arrangement shown in Fig. 1 being merely illustrative of one form which the invention takes.

In Fig. 1, the transformer is supported upon a carriage 20, the wheels 21 of which are adapted to travel on an overhead trackway 22. The primary leads of the transformer are indicated at 25, as extending to a suitable wall outlet (not shown) and as having sufficient length to allow the necessary travel of the carriage.

The flow of current from one electrode to the work and thence to the other electrode is controlled by one of the operators, preferably by means of a controller that is positioned within reach of the operator who is holding one of the electrodes. For convenience, the controller is indicated at 30, as comprising a push button switch that is mounted on the handle 48 for the electrode 10. Normally, the switch is held open by a spring, but is adapted when operated, to close the circuit through a relay 29, which in turn closes the circuit in the primary coil of the transformer. The conductors for the switch are shown at 31, as being attached to one of the secondary leads from the transformer.

To use the apparatus, one operator presses the electrode 10 against one of the plates to be welded, such as that indicated at 35 in Fig. 2, while another operator places the electrode 11 against the plate 36. While the electrodes are in contact with the work, one of the operators closes the switch 30 and holds it closed so long as he desires to maintain a flow of current through the work, the character and time varying in size with the material being welded. In Fig. 1, the plate 36 comprises the side wall of the body of the motor vehicle while the plate 35 comprises the inside wall of the tray 38.

It is desirable for some classes of work, that the electrode 10 be placed within the confines of the electrode 11, and so to allow a reasonable misalignment of the axes of the electrodes, the contactor 11 is illustrated as a square plate while the contacting face of the electrode 10 may comprise the narrow end of a truncated cone. I have found that satisfactory results may be obtained in welding sheet metal of at least 12 gauge by using current at approximately 18-volts and 200-amperes, with a contacting face on the electrode 10 of approximately one-eighth inch in diameter and the contacting face on the electrode 11 of approximately four inches square. These dimensions may be varied to suit any particular requirement, but I have found that for blind welding, the operator on each side of the work can move the electrodes progressively along the parts to be welded at regular estimated distances without necessitating marking of the work in advance. If desired, the plate may be made larger, the limit being a size which can be handled conveniently by an operator.

I have found that it is desirable to use a small cable for the flexible conductor in order to assure the desired degree of flexibility for ease in manipulation. I have further found that the heat generated during use is apt to burn a cable that is too small, but that if the heat is dissipated by a circulating current of water, the cables can be used indefinitely without danger of burning.

A suitable water cooling system which I have found to be satisfactory comprises conducting water from a service line 40 through a flexible conduit 41 to the transformer and thence downwardly through one of the secondary leads, thence back to the transformer, from whence it may be conducted down the other conductor and back to the transformer. From the transformer, a conduit 45 extends to a drain 46. In Fig. 6, the water passageway from the transformer to the flexible conduit is illustrated at 55, there being a tube 56 which leads from the passageway into the flexible conductor. Similarly, a tube 47 connects the free end of the conductor to the rigid tube 48, the return conduit 49 having communication with the tube 48 through the elbow 50. The same arrangement of parts is used for cooling each conductor. The tube 48 is preferably a rigid member, which not only acts as a conductor of current from the cable to the electrode, but also serves as a handle by means of which an operator may force the electrode against the work during the welding operation.

To facilitate the passage of water along the flexible conductors, I prefer to utilize strands that are twisted in the form of a cable and to sheathe the cable in a hose, the internal diameter of which is larger than the external diameter of the cable. This will allow the cooling liquid to flow through the cable and also along the outer surface of it thereby resulting in the highest efficiency of operation. The connection adjacent the transformer may comprise a spacing sleeve 80 around which the hose is held by a clamp 81. The sleeve 80 may comprise an extension of the terminal 82, which in turn is suitably fastened by securing members 83 to a transformer terminal 90. The connection at the electrode end of the cable may comprise a sleeve 84 which is rigidly attached, as by brazing, to a cable and which has an opening through which a tube 47 extends. A union nut 85 bears against a flange 86 on the sleeve and cooperates with the threaded portion on the tube 48 to lock the sleeve and tube together. The electrode end of the hose 75 is then clamped to the sleeve in any suitable way.

In the wiring diagram of Fig. 4, the primary coil of the transformer is indicated at P and the secondary at S. The secondary leads 12 and 13 are connected to the electrodes, but the flow of current to the secondary is controlled by the hand-operated circuit controller 30, the leads 31 of which are connected to the primary side of the coil in advance of a circuit breaker indicated in general at 28. To this end, a relay 29 is shown as being connected in the circuit formed by the leads 31, and as being arranged to actuate the breaker 28 so as to close the circuit to the primary coil of the transformer whenever the switch 30 is closed. When pressure on the switch 30 is released a spring 27 automatically opens the controller circuit whenever the current in the relay 29 is interrupted and the breaker 28 is automatically opened.

While I have described my apparatus, as being used for welding pieces of metal together, nevertheless it may also be used for putting a head on a rivet without requiring the rivet to be preheated in a furnace and without necessitating a hammer for producing the upsetting operation. My apparatus can therefore be used for making a riveted joint in those locations where a rivet may be desired.

To accomplish such purpose, the apparatus remains the same, but the shape of the electrodes is preferably changed. For example, in Fig. 7, each electrode is shown as having a cup-shaped end for receiving one end of the rivet. In practice, the cold rivet is inserted through the holes in the parts to be welded, the electrode 11 is placed against the head of the rivet and the electrode 10 is placed against the shank. The switch is then closed and is held closed until the heat developed softens the rivet; then, while the current is flowing, the operator pushes the electrode against the rivet and thereby molds the ends of it into a head. This operation can be accomplished in a few seconds with satisfactory results. I have found that not only is the rivet welded to the plates but that the plates are likewise welded to each other.

I have found, in using current in the amount that is necessary for commercial welding, that if the flexible conductors are allowed to get too close together, even though they are electrically insulated that they are quickly burned. I believe that the difficulty is caused by induction currents that exists around the cables while the current is flowing through them. I have found, however, that the difficulty can be overcome by taking precaution to keep the conductors out of close proximity to each other while the apparatus is in use. To this end, the secondary terminals 90 and 91 from the transformer are preferably spaced as far apart as possible, and care is exercised to maintain the flexible conductors separated by a distance that is at least equal to that between the secondary leads. I have found that a transformer which is capable of producing a welding current of 200-amperes at 18-volts will give satisfactory results if the secondary terminals are spaced apart approximately eight inches.

To assure a proper spacing of the flexible conductors, I may utilize spaced members 110 which extend between the conductors, but which preferably are adjustable, and are also readily detachable therefrom. Each member has a telescopic body and has a forked head at each end, which may be clamped to a forked head 111 which may be clamped around the conductor, the body portion is preferably made of an electrical non-conductor, such as a phenolic condensation product.

My invention is particularly well adapted for welding sheets of metal to tubes of metal without requiring an electrode to be placed inside the tube. For example, in Fig. 8, I have illustrated a sheet, at 100, in position for welding to a tube 101 in which one electrode 10 is placed against the outer surface of the plate, while the electrode 11 is placed against the outer surface of the tube. Current is then applied and a weld is made in the same manner as that heretofore described. When the electrode 10 is placed on the sheet, the weld takes place in a spot, whereas when the position of the electrodes is reversed, the weld takes place on a line. I have found that sheets may be welded to a tube in his manner by holding one elecrode against the tube until the first spot is welded and then moving the electrode 10 to succeeding spots, as shown by the broken lines 10a in Fig. 8, while maintaining the electrode 11 stationary. For light work, it is not necessary therefore, to keep the electrode 10 within the confines of the electrode 11. In fact, where the work is sufficiently light, I may clamp one of the electrodes to one of the members to be welded, and then move the other electrode along the other member to be welded. This, therefore, necessitates the use of only one man for welding.

From the foregoing description, it will be apparent that the two electrodes possess universality of movement with reference to each other and that they are therefore, capable of being used to weld pieces of metal which otherwise could not be conveniently united on the stationary welding machine. It will also be apparent that the apparatus, which I have described may be used for riveting without requiring the rivets to be preheated before being inserted into the work and without requiring an air hammer for upsetting the end of the rivet.

I claim:

A portable electrical welding apparatus comprising in combination a transformer, two flexible current carrying cables extending from the transformer, a rigid hollow electrode attached to the end of each cable, each cable having a fluid conducting passageway communicating with the hollow portion of one of the electrodes, and each electrode comprising a handle of such size that it may be grasped by an operator and thrust endwise against the work for imparting pressure thereagainst during the welding operation, each electrode being movable with relation to the work and independently of the other electrode, and each having a work contacting area that is different in size from the other, and a source of current supply for the transformer.

JAMES H. HOLAN, JR.